US012407973B2

(12) United States Patent
Zhang et al.

(10) Patent No.: US 12,407,973 B2
(45) Date of Patent: Sep. 2, 2025

(54) EARPHONE

(71) Applicant: Huawei Technologies Co., Ltd., Shenzhen (CN)

(72) Inventors: Tienan Zhang, Dongguan (CN); Haibo Shan, Dongguan (CN); Yan Li, Shenzhen (CN); Dasheng Mo, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 18/270,270

(22) PCT Filed: Dec. 18, 2021

(86) PCT No.: PCT/CN2021/139404
§ 371 (c)(1),
(2) Date: Jun. 29, 2023

(87) PCT Pub. No.: WO2022/143234
PCT Pub. Date: Jul. 7, 2022

(65) Prior Publication Data

US 2024/0107221 A1 Mar. 28, 2024

(30) Foreign Application Priority Data

Dec. 30, 2020 (CN) ........................ 202011612556.8

(51) Int. Cl.
*H04R 1/10* (2006.01)
*H04R 1/02* (2006.01)

(52) U.S. Cl.
CPC ........... *H04R 1/1083* (2013.01); *H04R 1/023* (2013.01); *H04R 1/1016* (2013.01); *H04R 1/1075* (2013.01); *H04R 2400/11* (2013.01); *H04R 2460/01* (2013.01)

(58) Field of Classification Search
None
See application file for complete search history.

(56) References Cited

U.S. PATENT DOCUMENTS

2019/0045291 A1* 2/2019 Kofman ............... A61B 5/0075

FOREIGN PATENT DOCUMENTS

| | | |
|---|---|---|
| CN | 106060689 A | 10/2016 |
| CN | 106101895 A | 11/2016 |
| CN | 109688513 A | 4/2019 |

(Continued)

*Primary Examiner* — Kenny H Truong
(74) *Attorney, Agent, or Firm* — Slater Matsil, LLP

(57) ABSTRACT

An earphone is provided, and includes a housing, a loudspeaker, and a noise cancellation microphone, the housing comprises an internal space, and a sound pickup channel. The noise cancellation microphone is connected to the communication surface by the sound pickup channel. The housing comprises an outer housing and a frame, the housing is provided with the internal space and a communication hole, and the frame is provided with a communication surface facing the communication hole. The communication surface comprises a sound-emitting hole and a sound pickup hole, the sound-emitting hole and the sound pickup hole are isolated from each other, and the sound-emitting hole is connected to the front cavity. The sound pickup channel and the front cavity are isolated from each other through the frame.

19 Claims, 7 Drawing Sheets

(56) References Cited

FOREIGN PATENT DOCUMENTS

| | | | | |
|---|---|---|---|---|
| CN | 209964254 U | | 1/2020 |
| CN | 210042133 U | | 2/2020 |
| CN | 211152189 U | | 7/2020 |
| CN | 211152190 U | * | 7/2020 |

* cited by examiner

EARPHONE

CROSS-REFERENCE TO RELATED APPLICATIONS

This application is a national stage of International Application No. PCT/CN2021/139404, filed on Dec. 18, 2021, which claims priority to Chinese Patent Application No. 202011612556.8, filed on Dec. 30, 2020. Both of the aforementioned applications are hereby incorporated by reference in their entireties.

TECHNICAL FIELD

This application relates to the earphone field, and in particular, to an earphone.

BACKGROUND

Currently, earphones in the market usually adopt an active noise cancellation mode to cancel noise heard by human ears, to optimize sound effect and sound quality of the earphones. Currently, there are mainly three active noise cancellation modes: feedforward active noise cancellation, feedback active noise cancellation, and hybrid active noise cancellation. The feedforward active noise cancellation means that noise of an outside world is picked up and the noise in the environment is cancelled. In this case, noise cancellation effect for wind noise is poor, and even the wind noise is amplified. The feedback active noise cancellation means that noise in an ear canal is picked up, and for a headphone or an in-ear earphone, passive noise cancellation effect of an ear tip and an ear cup is good, and impact of wind noise is small. Therefore, a noise cancellation microphone disposed in the ear tip and the ear cup has good noise cancellation effect. The hybrid active noise cancellation is implemented in combination with the foregoing two noise cancellation modes. For a semi-in-ear earphone, because there is no passive noise cancellation structure like an ear tip or an ear cup, a feedback noise cancellation microphone is interfered by an outside world, resulting in poor noise cancellation effect.

SUMMARY

In view of this, an earphone needs to be provided to improve noise cancellation effect.

According to a first aspect of embodiments of this application, an earphone is provided. The earphone includes a housing, a speaker, a noise cancellation microphone, a dust filter, and a cosmetic mesh. The housing is provided with inner space, a communication surface, and a sound pickup channel. The communication surface is configured to communicate the inner space with an outside world, a sound-emitting hole is provided on the communication surface, and the sound-emitting hole communicates with the inner space. The speaker is disposed in the inner space, the sound pickup channel is formed with a sound pickup opening on the communication surface, and the sound pickup channel is further formed with a sound pickup hole at another location of the housing. The noise cancellation microphone is disposed on the housing and covers the sound pickup hole, the dust filter is disposed on the communication surface, and the cosmetic mesh is disposed on the housing and covers the communication surface.

In the earphone, the sound-emitting hole is designed on the communication surface, the sound pickup opening is designed on the communication surface through the sound pickup channel, and the dust filter and the cosmetic mesh are added. In this way, the noise cancellation microphone receives noise toward an ear canal through the sound pickup opening, so that the received noise can be as similar as possible to noise in the ear canal. This optimizes a condition for noise cancellation debugging, and achieves better noise cancellation effect.

In a possible design of the first aspect, the dust filter covers the sound-emitting hole and the sound pickup opening. The sound-emitting hole and the sound pickup opening are covered, so that better dustproof effect can be achieved.

In a possible design of the first aspect, a sound resistance of an area of the dust filter that covers the sound pickup opening is lower than a sound resistance of an area of the dust filter that covers the sound-emitting hole. A lower sound resistance of the sound pickup opening helps the noise cancellation microphone receive noise through the sound pickup opening, so that the received noise can be as similar as possible to the noise in the ear canal.

In a possible design of the first aspect, a sound resistance of the dust filter at the sound pickup opening is less than or equal to 10 MKS Rayls.

In a possible design of the first aspect, the dust filter covers the sound-emitting hole, but does not cover the sound pickup opening. The sound pickup opening is not covered, so that the noise cancellation microphone can receive the noise in the ear canal at maximum.

In a possible design of the first aspect, the housing includes an outer housing and a frame. The outer housing is provided with a communication hole and the inner space, and the communication hole communicates with the outside world. The frame is disposed in the inner space and is disposed close to the communication hole, the frame is provided with the communication surface facing the communication hole, and the sound-emitting hole communicates the inner space with the communication hole. The sound pickup channel is disposed on the frame, the noise cancellation microphone is disposed on the frame, and the sound pickup opening communicates the sound pickup channel with the communication hole. The cosmetic mesh is located between the outer housing and the frame and covers the communication hole. The frame is designed to facilitate reasonable designs of locations of the sound pickup channel and the sound-emitting hole.

In a possible design of the first aspect, the outer housing includes a front housing and a rear housing. The front housing is disposed on the rear housing, the front housing and the rear housing jointly enclose the inner space. The frame and the speaker are disposed on the front housing, the speaker and the frame divide the inner space into a front cavity and a rear cavity, the front cavity is located between the speaker and the frame, and the rear cavity is located between the speaker and the rear housing. The noise cancellation microphone is located in the front cavity, the communication hole is disposed on the front housing, and the communication hole communicates the front cavity with the outside world. The dust filter and the cosmetic mesh are disposed between the front housing and the frame. The front and rear housings are designed to facilitate mounting of the frame and the speaker, and facilitate production and processing.

In a possible design of the first aspect, the frame is provided with a mounting surface close to the sound-emitting hole. The sound pickup hole is formed on the mounting surface and is close to the communication surface, the noise cancellation microphone is disposed on the mounting surface through a connecting part, and the sound pickup hole communicates with a sound pickup end of the noise cancellation microphone. A design of the mounting surface close to the sound-emitting hole is conducive to achieving a maximum approach of the noise cancellation microphone to the communication surface, and is more conducive to receiving the noise in the ear canal.

In a possible design of the first aspect, the earphone further includes a sealing part, and the sealing part is configured to seal the outer housing and the frame at the communication hole and the communication surface. The sealing part is designed to protect against dust and prevent a sound wave from spreading through a gap.

In a possible design of the first aspect, the sealing part includes a first sealing part, a second sealing part, and a third sealing part. The first sealing part is disposed between the dust filter and the communication surface, to seal the dust filter on the communication surface. The second sealing part is disposed between the outer housing and the cosmetic mesh, so that the cosmetic mesh is disposed on the outer housing, and the communication hole is sealed. The third sealing part is disposed between the dust filter and the cosmetic mesh, to implement sealing between the dust filter and the cosmetic mesh.

In a possible design of the first aspect, each of the first sealing part and the third sealing part is provided with openings at respective locations relative to the sound-emitting hole and the sound pickup opening, so that the sound-emitting hole and the sound pickup opening are separated at the communication hole between the outer housing and the frame. In this way, a sound emitted by the speaker from the sound-emitting hole has minimal impact on the noise cancellation microphone in the sound pickup opening, so that the noise cancellation microphone can receive the noise in the ear canal as much as possible.

In a possible design of the first aspect, the first sealing part, the second sealing part, and the third sealing part are double-sided adhesives or glue. This saves costs and improves mounting efficiency.

In a possible design of the first aspect, the sound pickup opening is isolated from the sound-emitting hole, and the sound pickup channel is isolated from the front cavity through the frame. This minimizes impact of the speaker on sound pickup of the noise cancellation microphone.

In a possible design of the first aspect, the rear housing includes an earphone front end and an earphone rear end. The earphone front end is used for mounting the speaker and the front housing, and the earphone rear end is used for hand holding. The earphone rear end is convenient for a user to hold, so that the earphone is worn on an ear of the user.

In a possible design of the first aspect, the rear cavity is provided with a circuit board, a battery module, a power input unit, a communication unit, or a call microphone.

In a possible design of the first aspect, the cosmetic mesh is a metal mesh. This improves style and mechanical reliability of the earphone, and prevents the inner dust filter, speaker, and noise cancellation microphone from being damaged by an external force.

In a possible design of the first aspect, a sound resistance of the cosmetic mesh is less than or equal to 10 Rayls MKS.

In a possible design of the first aspect, the sound pickup opening is located on a side that is of the communication surface and that is away from the speaker. This helps reduce impact of the speaker on sound pickup of the noise cancellation microphone.

In a possible design of the first aspect, the earphone is further provided with an active noise cancellation microphone. This can further improve sound quality.

DESCRIPTION OF REFERENCE NUMERALS FOR MAIN COMPONENTS

Figure 1:
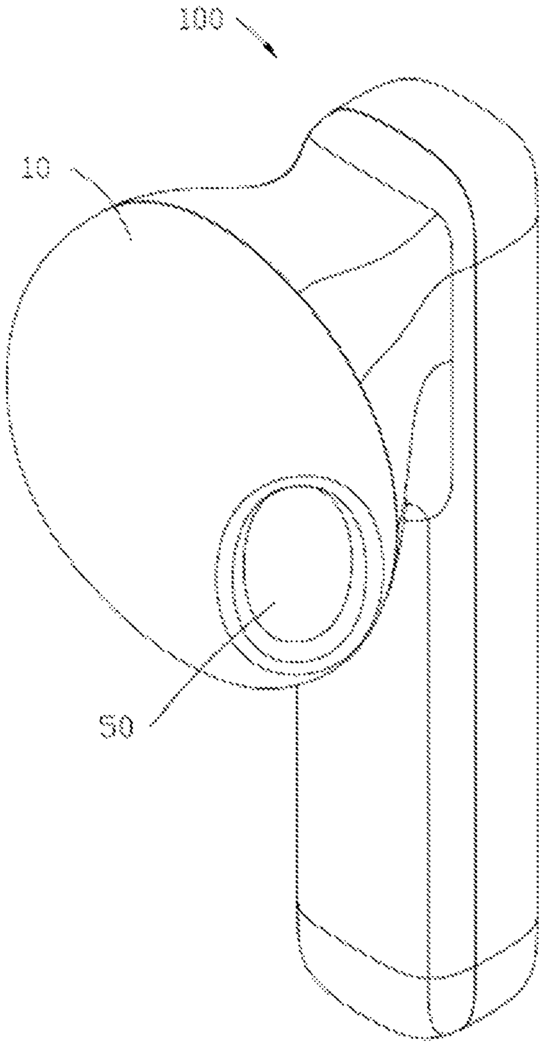
FIG. 1 is a schematic diagram of a structure of an earphone according to a first embodiment of this application.

Earphone 100, 200, 300
Housing 10
Outer housing 11
Front housing 111
Rear housing 112
Earphone front end 1121
Earphone rear end 1122
Frame 12
Communication surface 121
Sound-emitting hole 122
Sound pickup channel 123
Sound pickup opening 124
Sound pickup hole 125
Mounting surface 126
Inner space 13
Front cavity 131
Rear cavity 132
Communication hole 14
Speaker 20
Noise cancellation microphone 30
Connecting part 31
Dust filter 40
Cosmetic mesh 50
Sealing part 60
First sealing part 61
Second sealing part 62
Third sealing part 63

In the following specific embodiments, the present invention is further described with reference to the accompanying drawings.

DETAILED DESCRIPTION OF ILLUSTRATIVE EMBODIMENTS

The following describes the technical solutions in embodiments of this application with reference to the accompanying drawings in embodiments of this application.

The following terms “first”, “second”, and the like are merely used for description, and shall not be understood as an indication or implication of relative importance or implicit indication of a quantity of indicated technical features. Therefore, a feature limited by “first” or “second” may explicitly or implicitly include one or more features. In the descriptions of this application, unless otherwise stated, “a plurality of” means two or more than two. Orientation terms such as “up”, “down”, “left”, and “right” are defined relative to an orientation of schematic placement of components in the accompanying drawings. It should be understood that these directional terms are relative concepts and are used for relative description and clarification. These directional terms may vary accordingly depending on an orientation in which the components are placed in the accompanying drawings.

In this application, unless otherwise explicitly specified and limited, a term “connection” should be understood in a broad sense. For example, the “connection” may be a fastened connection, a detachable connection, an integrated connection, may be a direct connection, or an indirect connection through an intermediate medium. The term “and/or” used in this specification includes any and all combinations of one or more related listed items.

When the following embodiments are described in detail with reference to schematic diagrams, for ease of description, a diagram indicating a partial structure of a component is partially enlarged not based on a general scale. In addition, the schematic diagrams are merely examples, and should not limit the protection scope of this application herein.

Embodiment 1

Figure 2:
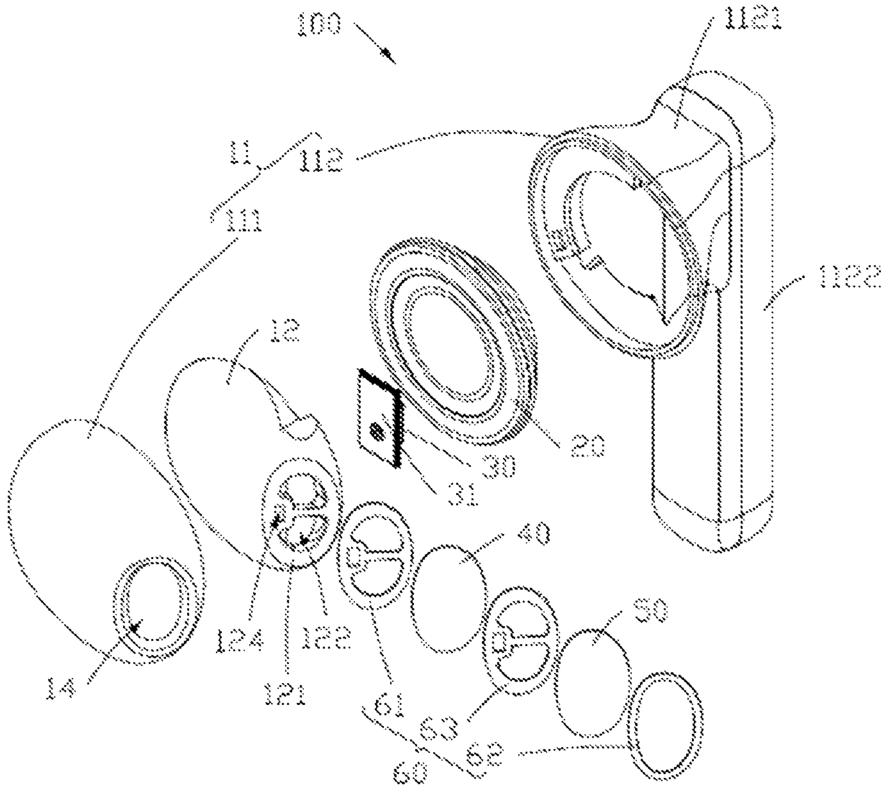
FIG. 2 is a partial exploded three-dimensional schematic diagram of the earphone shown in FIG. 1.

FIG. 1 and FIG. 2 show an earphone 100 according to a first embodiment of this application. The earphone 100 can perform active noise cancellation to cancel noise in an ear canal, to improve sound effect and sound quality of the earphone 100. The earphone 100 may be an in-ear earphone, a semi-in-ear earphone, a headphone, or the like, and in particular, relates to a semi-in-ear earphone.

The earphone 100 includes a housing 10, a speaker 20, a noise cancellation microphone 30, a dust filter 40, and a cosmetic mesh 50. The housing 10 is provided with inner space 13 that communicates with the outside. The speaker 20 and the noise cancellation microphone 30 are disposed in the inner space 13 (refer to FIG. 4) of the housing 10. The dust filter 40 and the cosmetic mesh 50 are disposed on the housing 10 and are located at a location at which the inner space 13 communicates with the outside, so that the inner space 13 communicates with the outside through the dust filter 40 and the cosmetic mesh 50.

The housing 10 includes an outer housing 11 and a frame 12. The outer housing 11 is provided with the inner space 13 and a communication hole 14. The communication hole 14 is configured to communicate the inner space 13 with an outside world. In addition, when the earphone 100 is worn on a human ear, the communication hole 14 points to an ear canal of a human body. The frame 12 is disposed in the inner space 13 of the outer housing 11 and is disposed close to the communication hole 14. The noise cancellation microphone 30 is disposed on the frame 12. The dust filter 40 and the cosmetic mesh 50 are located between the outer housing 11 and the frame 12 and cover the communication hole 14.

Specifically, the outer housing 11 includes a front housing 11 and a rear housing 112. The front housing 11 is disposed on the rear housing 112, and the front housing 111 and the rear housing 112 jointly enclose the inner space 13. The frame 12 is disposed on the front housing 111. The speaker 20 is disposed on the front housing 111. The speaker 20 and the frame 12 divide the inner space 13 into a front cavity 131 and a rear cavity 132. The front cavity 131 is located between the speaker 20 and the frame 12. The rear cavity 132 is located between the speaker 20 and the rear housing 112. The noise cancellation microphone 30 is located in the front cavity 131. The communication hole 14 is disposed on the front housing 111. The communication hole 14 communicates the front cavity 131 with the outside world. The dust filter 40 and the cosmetic mesh 50 are disposed between the front housing 111 and the frame 12 and cover the communication hole 14.

Figure 3:
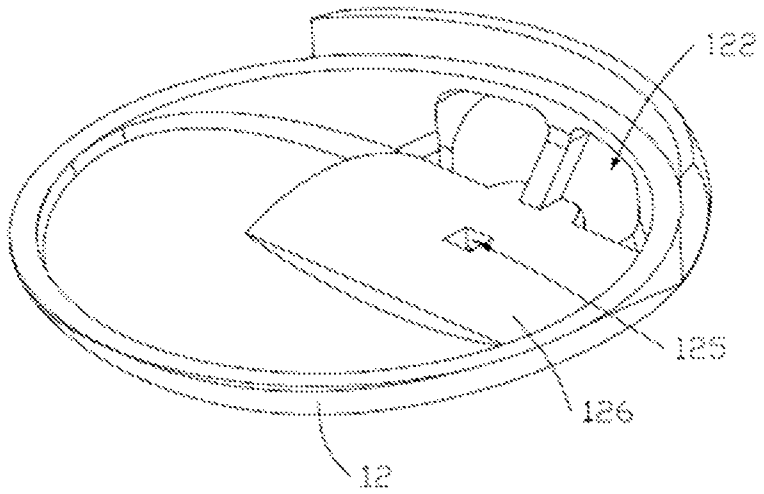
FIG. 3 is a three-dimensional schematic diagram of a frame of the earphone shown in FIG. 2.
Figure 4:
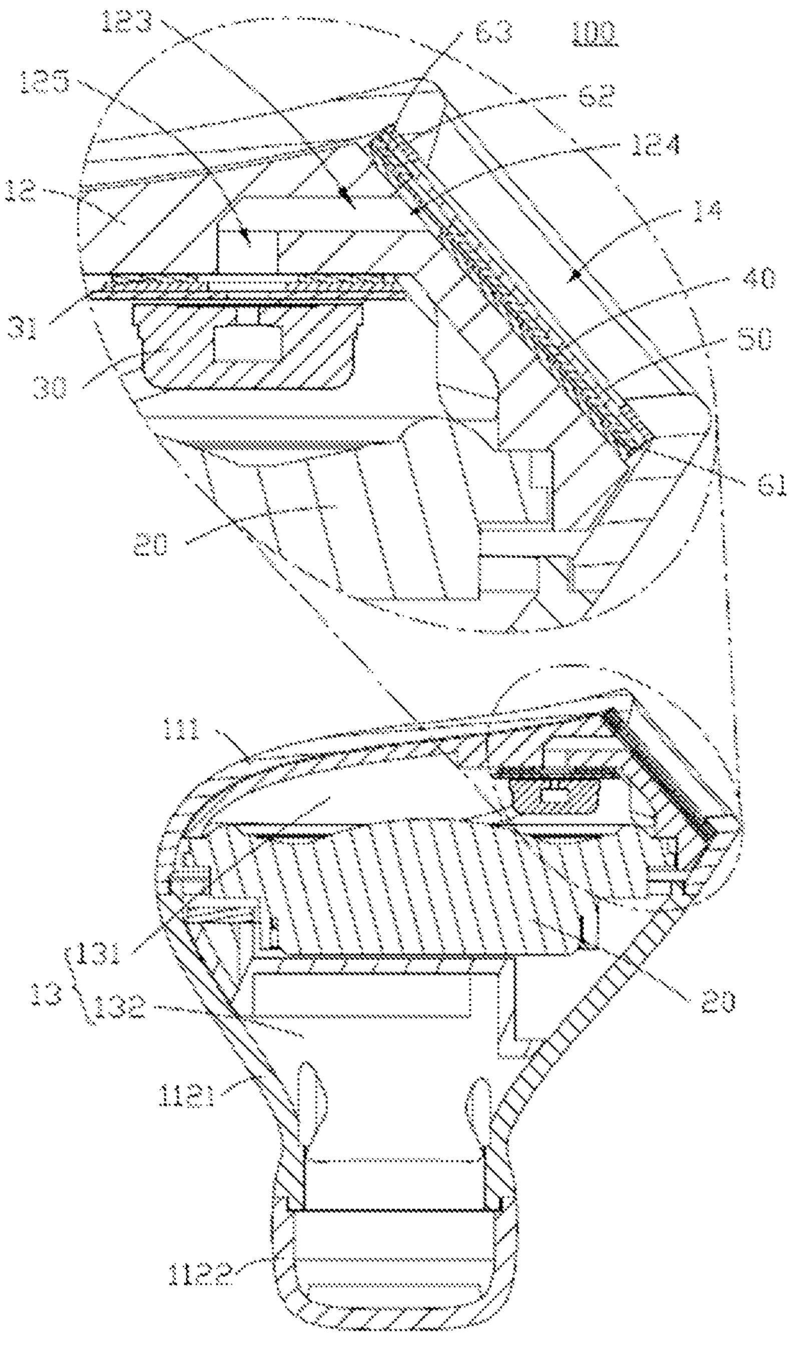
FIG. 4 is a sectional view of the earphone shown in FIG. 1.

As shown in FIG. 3 and FIG. 4, an inner wall of the frame 12 roughly matches an inner wall of the front housing 111. The frame 12 is provided with a communication surface 121 facing the communication hole 14. A sound-emitting hole 122 is provided on the communication surface 121. The sound-emitting hole 122 communicates the front cavity 131 with the communication hole 14. The frame 12 is further provided with a sound pickup channel 123. The sound pickup channel 123 is formed with a sound pickup opening 124 on the communication surface 121, and the sound pickup channel 123 is further formed with a sound pickup hole 125 at another location of the frame 12. The noise cancellation microphone 30 is disposed on the frame 12 and covers the sound pickup hole 125. On the communication surface 121, the sound pickup opening 124 is isolated from the sound-emitting hole 122, and the sound pickup channel 123 is isolated from (not communicates with) the front cavity 131 through the frame 12, to minimize impact of the speaker 20 on sound pickup of the noise cancellation microphone 30.

In this embodiment, the sound pickup opening 124 is located on a side that is of the communication surface 121 and that is away from the speaker 20. There are two sound-emitting holes 122, and the sound-emitting holes 122 are symmetrically disposed on the communication surface 121. The sound pickup opening 124 is located between the two sound-emitting holes 122. However, this is not limited. In another embodiment, there may alternatively be one or more sound-emitting holes 122.

The speaker 20 is configured to emit a sound to the front cavity 131, to transmit the sound to the ear canal through the sound-emitting hole 122 and the communication hole 14.

The noise cancellation microphone 30 is a feedback microphone (Feedback Mic, FB Mic, or Error Mic), and is configured to receive, pick up, and detect residual noise in an ear canal between the earphone and a human ear after the earphone is worn, and enable, by using an algorithm (a built-in unit of the noise cancellation microphone 30, another unit in the earphone 100, or an external processing unit), the speaker 20 of the earphone to release a reverse sound wave to cancel the noise.

An inner wall of the frame 12 is provided with a mounting surface 126 close to the sound-emitting hole 122. The sound pickup hole 125 is formed on the mounting surface 126 and is close to the communication surface 121. The noise cancellation microphone 30 is disposed on the mounting surface 126 through a connecting part 31, and the sound pickup hole 125 communicates with a sound pickup end of the noise cancellation microphone 30. In this way, noise in the ear canal is transmitted to the noise cancellation microphone 30 through the communication hole 14 and the sound pickup channel 123.

The connecting part 31 may be an adhesive like a double-sided adhesive or glue.

As shown in FIG. 4, the dust filter 40 is disposed on the communication surface 121 and covers the sound-emitting hole 122 and the sound pickup opening 124. The cosmetic mesh 50 is disposed on the front housing 11 and completely covers the communication hole 14.

The earphone 100 further includes a sealing part 60. The sealing part 60 is configured to seal the outer housing 11 and the frame 12 at the communication hole 14 and the communication surface 121.

The sealing part 60 includes a first sealing part 61, a second sealing part 62, and a third sealing part 63. Both the dust filter 40 and the cosmetic mesh 50 are planar meshes whose shapes are similar to a shape of the communication surface 121. The first sealing part 61 is disposed between the dust filter 40 and the communication surface 121, to seal the dust filter 40 on the communication surface 121. The second sealing part 62 is disposed between the front housing 11 and the cosmetic mesh 50, so that the cosmetic mesh 50 is disposed on the front housing 111, and the communication hole 14 is sealed. The third sealing part 63 is disposed between the dust filter 40 and the cosmetic mesh 50, to implement sealing between the dust filter 40 and the cosmetic mesh 50.

Each of the first sealing part 61 and the third sealing part 63 is provided with openings at respective locations relative to the sound-emitting hole 122 and the sound pickup opening 124, so that the sound-emitting hole 122 and the sound pickup opening 124 are separated at the communication hole 14 between the outer housing 11 and the frame 12. In this way, the sound emitted by the speaker 20 from the sound-emitting hole 122 has minimal impact on the noise cancellation microphone 30 in the sound pickup opening 124, so that the noise cancellation microphone 30 can receive the noise in the ear canal as much as possible. The second sealing part 62 is substantially ring-shaped, so that the cosmetic mesh 50 is disposed on a wall surface around the communication hole 14 of the front housing 111.

Adhesives such as a double-sided adhesive or glue may be selected for the first sealing part 61, the second sealing part 62, and the third sealing part 63.

The dust filter 40 is configured to prevent external dust from entering the earphone and affecting sound effect and sound quality of the earphone.

The cosmetic mesh 50 is preferably a metal mesh, to improve style and mechanical reliability of the earphone, and prevent the inner dust filter 40, speaker 20, and noise cancellation microphone 30 from being damaged by an external force, for example, prevent an external sharp object from piercing.

A damping of the cosmetic mesh 50 needs to be as small as possible. Preferably, a sound resistance of the cosmetic mesh 50 is less than 10 Rayls MKS (Rayleigh, where in an MKS system, 1 Rayleigh is 1 Pascal-second per meter, and 1 Rayls=1 Pa×s/m), to ensure that the cosmetic mesh 50 has small impact on sound pickup of the noise cancellation microphone 30.

The rear housing 112 includes an earphone front end 1121 and an earphone rear end 1122. The earphone front end 1121 is used for mounting the speaker 20 and the front housing 11. The earphone rear end 1122 is convenient for a user to hold, so that the earphone 100 is worn on an ear of the user.

During use, the user holds the earphone rear end 1122 and wears, on the ear, the earphone front end 1121 provided with the front housing 11, so that a side provided with the communication hole 14 faces the ear canal. The noise cancellation microphone 30 receives noise in an ear canal, and the speaker 20 emits a sound with a reverse sound wave, so that the noise in the ear canal is eliminated from a sound heard by the human ear, thereby improving sound effect and sound quality of the earphone.

The rear cavity 132 is configured to dispose another component of the earphone, for example, a circuit board configured to control the earphone, a battery module configured to store electric energy, a power input unit configured to communicate with an external power supply unit, a communication unit configured to perform signal transmission with the outside, or a call microphone configured to receive a sound made by the user.

Further, the earphone 100 may be provided with a component and design that improve sound quality and wearing comfort in a common earphone, like an active noise cancellation microphone (Feedforward Mic or Ref Mic) or a pressure relief hole.

According to the earphone 100 provided in this application, the communication surface 121 faces the ear canal, the independent sound pickup channel 123 is disposed on the frame 12 to enable the sound pickup opening 124 to be as close as possible to the ear canal, and the sound pickup opening 124 of the sound pickup channel 123 and the sound-emitting hole 122 are separated on the communication surface 121. In addition, the dust filter 40 is added, and the sound pickup opening 124 and the sound-emitting hole 122 between the communication hole 14 and the communication surface 121 are separated by the sealing part 60. In this way, the noise cancellation microphone 30 receives noise toward the ear canal through the sound pickup opening 124, so that the received noise can be as similar as possible to the noise in the ear canal. This optimizes a condition for noise cancellation debugging, achieves better noise cancellation effect, and achieves better dustproof effect.

Embodiment 2

Figure 5:
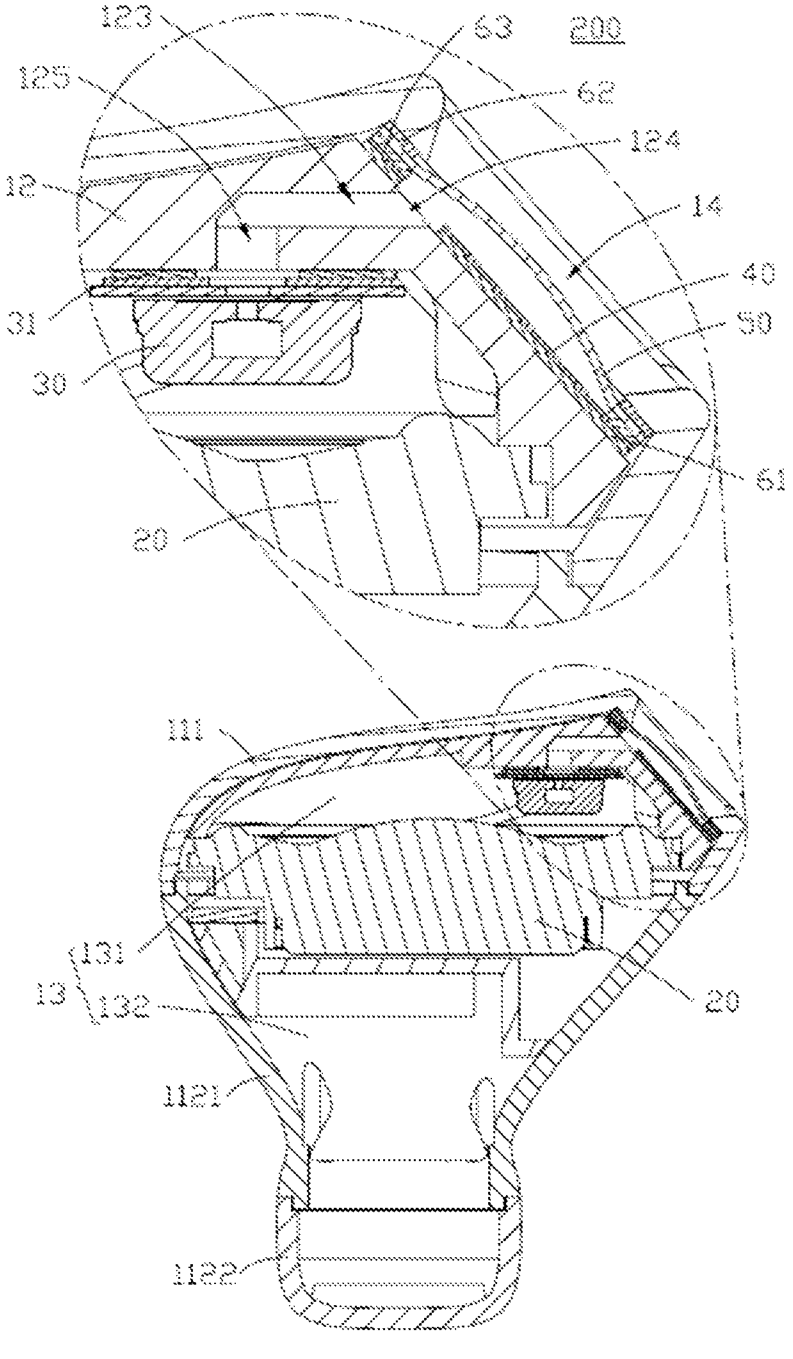
FIG. 5 is a sectional view of an earphone according to a second embodiment of this application.

FIG. 5 shows an earphone 200 according to a second embodiment of this application.

The earphone 200 has a same structure as the earphone 100, and includes the housing 10, the speaker 20, the noise cancellation microphone 30, the dust filter 40, and the cosmetic mesh 50. A main difference from the earphone 100 in the first embodiment shown in FIG. 1 lies in that structures of the dust filter 40, the cosmetic mesh 50, and the sealing part 60 are different.

Specifically, the dust filter 40 covers only the sound-emitting hole 122, but does not cover the sound pickup opening 124. The cosmetic mesh 50 is in an outwardly protruding shape. The third sealing part 63 in the sealing part 60 is substantially ring-shaped, to connect an outer periphery of the cosmetic mesh 50 to an outer periphery of the dust filter 40 in a sealed manner.

According to the earphone 200 provided in this application, the communication surface 121 faces the ear canal, the independent sound pickup channel 123 is disposed on the frame 12, and the sound pickup opening 124 of the sound pickup channel 123 and the sound-emitting hole 122 are separated on the communication surface 121. In this way, the noise cancellation microphone 30 receives noise toward the ear canal through the sound pickup opening 124, so that the received noise can be as similar as possible to the noise in the ear canal. This optimizes a condition for noise cancellation debugging, and achieves better noise cancellation effect.

Embodiment 3

Figure 6:
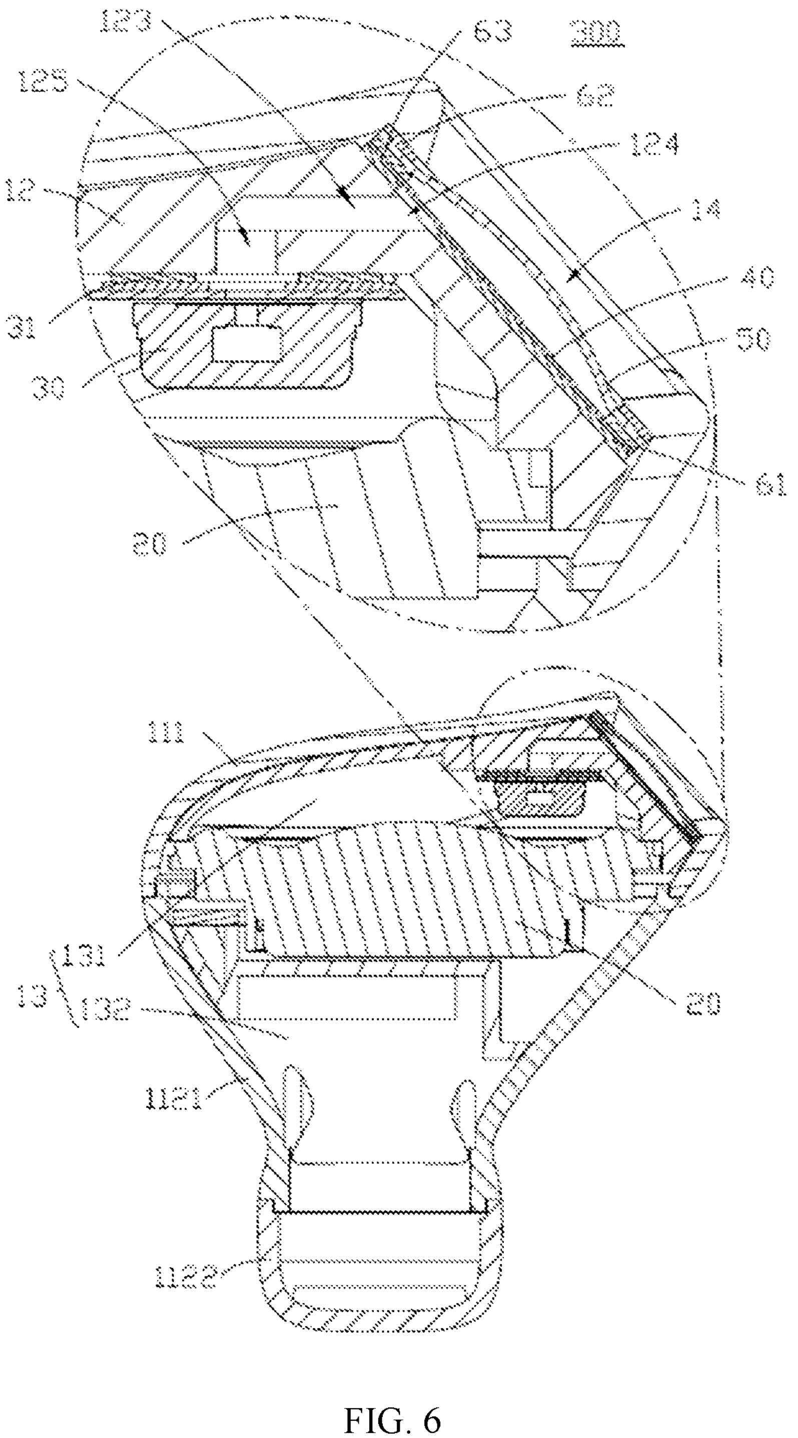
FIG. 6 is a sectional view of an earphone according to a third embodiment of this application.

FIG. 6 shows an earphone 300 according to a third embodiment of this application.

The earphone 300 has a same structure as the earphone 200, and includes the housing 10, the speaker 20, the noise cancellation microphone 30, the dust filter 40, and the cosmetic mesh 50. A main difference from the earphone 200 in the second embodiment shown in FIG. 5 lies in that a structure of the dust filter 40 is different.

Specifically, aperture density of an area of the dust filter 40 that covers the sound-emitting hole 122 is different from aperture density of an area of the dust filter 40 that covers the sound pickup opening 124. Therefore, an aperture of the dust filter 40 at the sound pickup opening 124 is larger, and in this case, a sound resistance of the dust filter 40 at the sound pickup opening 124 is lower (less than or equal to 10 MKS Rayls).

According to the earphone 300 provided in this application, the communication surface 121 faces the ear canal, the independent sound pickup channel 123 is disposed on the frame 12, and the sound pickup opening 124 of the sound pickup channel 123 and the sound-emitting hole 122 are separated on the communication surface 121. In addition, the dust filter 40 is added, and a damping of the dust filter 40 at the sound pickup opening 124 is reduced through adjustment. In this way, the noise cancellation microphone 30 receives noise toward the ear canal through the sound pickup opening 124, so that the received noise can be as similar as possible to the noise in the ear canal. This optimizes a condition for noise cancellation debugging, and achieves better noise cancellation effect.

Embodiment 4

Figure 7:
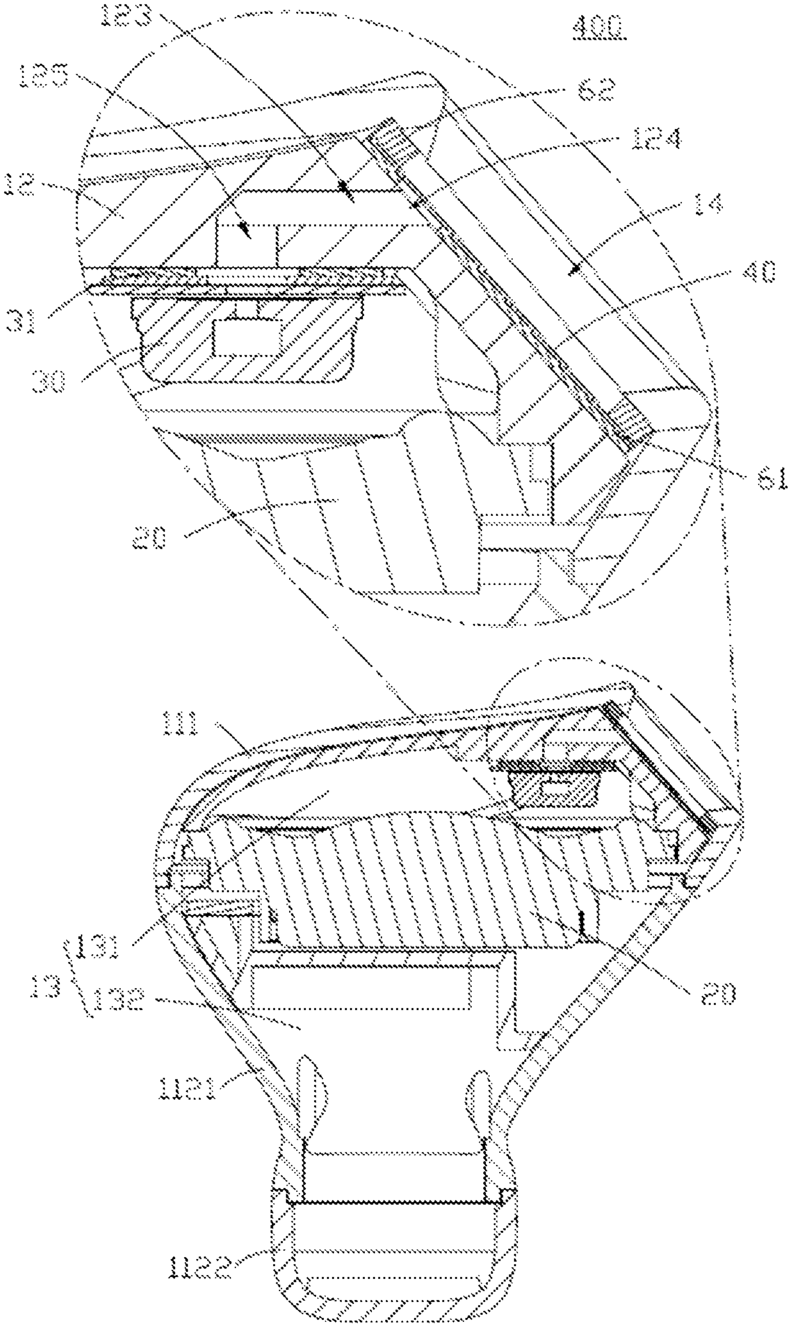
FIG. 7 is a sectional view of an earphone according to a fourth embodiment of this application.

FIG. 7 shows an earphone 400 according to a fourth embodiment of this application.

The earphone 400 has a same structure as the earphone 100, and includes the housing 10, the speaker 20, the noise cancellation microphone 30, and the dust filter 40. A main difference from the earphone 100 in the second embodiment shown in FIG. 1 lies in that the cosmetic mesh 50 is not provided.

Specifically, the dust filter 40 may be made of a material with high mechanical strength, to simultaneously implement functions of the dust filter 40 and the cosmetic mesh 50 in the earphone 100. The sealing part 60 includes only the first sealing part 61 and the second sealing part 62. The first sealing part 61 is disposed between the dust filter 40 and the communication surface 121, to seal the dust filter 40 on the communication surface 121. The second sealing part 62 is disposed between the front housing 111 and the dust filter 40, so that the dust filter 40 is disposed on the front housing 111, and the communication hole 14 is sealed.

Similar to that in the earphone 300 in Embodiment 3, aperture density on the dust filter 40 in the earphone 400 may further be designed as that an aperture for covering the sound-emitting hole 122 is greater than an aperture for covering the sound pickup opening 124. In this case, a sound resistance of the dust filter 40 at the sound pickup opening 124 is lower.

Certainly, in another embodiment, there may be a plurality of dust filters 40, and the dust filters 40 separately cover the sound-emitting hole 122 and the sound pickup opening 124 (may be disposed on a hole wall or on a surface of the communication surface 121). The sealing part 60 includes only the second sealing part 62, and the second sealing part 62 is disposed between the front housing 11 and the communication surface 121, to seal the communication hole 14 on the front housing 11 through the communication surface 121.

According to the earphone 400 provided in this application, the communication surface 121 faces the ear canal, the independent sound pickup channel 123 is disposed on the frame 12, and the sound pickup opening 124 of the sound pickup channel 123 and the sound-emitting hole 122 are separated on the communication surface 121. In addition, the dust filter 40 is added, and a damping of the dust filter 40 at the sound pickup opening 124 is reduced through adjustment. In this way, the noise cancellation microphone 30 receives noise toward the ear canal through the sound pickup opening 124, so that the received noise can be as similar as possible to the noise in the ear canal. This optimizes a condition for noise cancellation debugging, and achieves better noise cancellation effect.

This application further provides a terminal apparatus, where the terminal apparatus has the earphone 100, the earphone 200, or the earphone 300.

The terminal apparatus may be glasses, an AR apparatus, a VR apparatus, or another product with audio effect.

The foregoing description is merely specific implementations of this application, but is not intended to limit the protection scope of this application. Any variation or replacement within the technical scope disclosed in this application shall fall within the protection scope of this application.

What is claimed is:

1. An earphone, comprising a housing, a loudspeaker, and a noise cancellation microphone, wherein:

the housing comprises an internal space, a communication surface for connecting the internal space and an outside world, and a sound pickup channel;

the noise cancellation microphone is connected to the communication surface by the sound pickup channel;

the loudspeaker is disposed in the internal space, the internal space comprises a front cavity, and the loudspeaker is connected to the communication surface by the front cavity;

the housing comprises an outer housing and a frame, the housing is provided with the internal space and a communication hole, and the frame is provided with the communication surface facing the communication hole;

the communication surface comprises a sound-emitting hole and a sound pickup hole, the sound-emitting hole and the sound pickup hole are isolated from each other, and the sound-emitting hole is connected to the front cavity;

the sound pickup channel is disposed on the frame, the sound pickup channel forms a radio reception port on the communication surface and forms a sound reception hole at a position of the frame, and the sound reception hole is connected to a sound reception end of the noise cancellation microphone; and, the sound pickup channel and the front cavity are isolated from each other through the frame.

2. The earphone according to claim 1, wherein the noise cancellation microphone is disposed on the frame.

3. The earphone according to claim 1, wherein the housing comprises a front housing and a rear housing, and the front housing and the rear housing jointly surround to form an inner space, and wherein at least one of:

the frame is disposed on the front housing; or the loudspeaker is disposed on the front housing.

4. The earphone according to claim 3, wherein the rear housing comprises a front end of the earphone and a rear end of the earphone, the front end of the earphone is configured to install the loudspeaker and set the front housing, and the rear end of the earphone is configured to be handheld.

5. The earphone according to claim 1, wherein the internal space comprises the front cavity and a rear cavity;

wherein the front cavity is located between the loudspeaker and the frame; and wherein the rear cavity is located between the loudspeaker and a rear housing.

6. The earphone of claim 5, wherein the noise cancellation microphone is located in the front cavity.

7. The earphone according to claim 5, wherein the rear cavity is provided with a circuit board, a battery module, a power input unit, a communications unit, or a call microphone.

8. The earphone according to claim 1, wherein the frame is disposed in the internal space of the housing, and wherein the frame is disposed close to the communication surface.

9. The earphone according to claim 1, wherein a sound reception port is located on a connection surface, and the sound reception port is located on a side of a sound output hole away from the loudspeaker.

10. The earphone according to claim 9, wherein the earphone further comprises a dust filter, and a dustproof net is disposed on the communication surface.

11. The earphone according to claim 10, wherein the dust filter covers the sound-emitting hole and the sound pickup hole.

12. The earphone according to claim 10, wherein the earphone further comprises an appearance net, and the appearance net covers the connection surface and the dust filter.

13. The earphone according to claim 12, wherein the appearance net is a metal mesh.

14. The earphone according to claim 12, wherein a shape of the appearance net is an outwardly protruding shape.

15. The earphone according to claim 12, wherein the earphone further comprises a seal, and the seal is configured to seal the housing and the frame at the communication hole and the communication surface.

16. The earphone according to claim 15, wherein the seal comprises a first seal, a second seal, and a third seal, and the first seal is disposed between the dust filter and the communication surface, so as to seal the dustproof net on the communication surface;

wherein the second seal is disposed between the housing and the appearance net, so that the appearance net is disposed on the housing and the communication hole is sealed; and wherein the third seal is disposed between the dustproof net and the appearance net, so as to seal the dustproof net and the appearance net.

17. The earphone according to claim 16, wherein an opening is disposed on both the first seal and the third seal relative to the sound-emitting hole and the sound pickup hole; and wherein the sound-emitting hole at the communication hole and the sound pickup hole are separated between the housing and the frame.

18. The earphone according to claim 17, wherein the first seal, the second seal, and the third seal are double-sided adhesive or glue.

19. The earphone according to claim 1, wherein a mounting surface is disposed on the frame close to a sound output hole, the sound receiving hole is formed on the mounting surface and close to the communication surface, and the noise cancellation microphone is disposed on the mounting surface by a connector.

* * * * *